United States Patent [19]

Waldron

[11] Patent Number: 4,829,676
[45] Date of Patent: May 16, 1989

[54] HANDS-FREE LEVEL INDICATING DEVICE

[76] Inventor: David C. Waldron, 62 River St., Apt. 3, Cambridge, Mass. 02139

[21] Appl. No.: 81,477

[22] Filed: Aug. 4, 1987

[51] Int. Cl.[4] .............................................. G01C 9/16
[52] U.S. Cl. ....................................... 33/372; 33/381
[58] Field of Search ................. 33/370, 371, 372, 373, 33/347, 374, 376, 381; 224/274; 248/231.8

[56] References Cited

U.S. PATENT DOCUMENTS

| | | | |
|---|---|---|---|
| 1,940,808 | 12/1933 | Linsert | 33/372 |
| 3,707,772 | 1/1973 | Cutter | 33/373 |
| 3,844,459 | 10/1974 | Chambers | 224/274 |
| 4,290,207 | 9/1981 | Browning et al. | |
| 4,295,279 | 10/1981 | Sienknecht | 33/373 X |
| 4,419,833 | 12/1983 | Wright | 33/379 |
| 4,501,057 | 2/1985 | Palomera | |
| 4,589,213 | 5/1986 | Woodward | |
| 4,593,475 | 6/1986 | Mayes | |

Primary Examiner—Harry N. Haroian
Attorney, Agent, or Firm—Weingarten, Schurgin, Gagnebin & Hayes

[57] ABSTRACT

A level indicating device comprising a level having attached thereto a pair of detachable securing clips whereby the level indicating device can be maintained mounted flush with a structural member in any spatial orientation without further manual manipulation. The level has clip receiving slots formed in the opposed ends thereof adapted for force-fit reception of the detachable securing clips. The detachable securing clips have mirror-image symmetry and comprise a transverse segment adapted to be force fit inserted into the clip receiving slots, a pair of opposed leg segments extending from opposed ends of the transverse segment for elastically engaging the outer peripheral surface of the structural member to maintain the level indicating device flush with the structural member, and curved end segments terminating the opposed leg segments. The detachable securing clips may be formed in cross-sectional configurations which are compatible for elastically engaging the periphery of structural members of a wide variety of shapes such as pipes and construction-type beams. The length of the opposed leg segments may be varied to form a set of detachable securing clips which can elastically engage structural members having a wide range of ODs or outer dimensions or configurations. The level further includes at least one level indicating means for determining the spatial orientation of the structural member. The level indicating means comprises a liquid filled glass tube having a movable reference mark disposed therein and a plurality of visually perceptible gradations superimposed on the outer surface thereof. Each pair of adjacent gradations defines a field therebetween which represents a predetermined pitch rate.

12 Claims, 1 Drawing Sheet

HANDS-FREE LEVEL INDICATING DEVICE

BACKGROUND OF THE INVENTION

This invention relates generally to levels, and more particularly to a level indicating device having detachable securing clips which permits the level to be used by carpenters, electricians, plumbers and other craftsmen without continual manual manipulation, the securing clips associated with the level enabling the level indicating device to be elastically engaged and retained flush with pipes, rods, beams and other structural members during alignment and subsequent permanent fixation of the structural member in a predetermined spatial orientation.

Operations in the construction industry in general require that structural members such as pipes, rods and beams be precisely aligned in a predetermined spatial orientation and temporarily maintained in such spatial orientation while the structural member is permanently fixed in the desired position. While the typical spatial orientation for most structural members is either horizontal or vertical, it is not unusual for a structural member to be pitched at an angle with respect to the horizontal or vertical.

A level, as for example a spirit level, is ordinarily used to precisely align structural members in the desired horizontal, vertical or pitched spatial orientation. A spirit level includes one or more slightly curved glass tubes, filled with a liquid such as alcohol or ether, which are disposed in horizontal, vertical or pitched planes. The desired spatial orientation of the structural member is achieved by centering a bubble within a particular reference field of the appropriate glass tube. The level is periodically referenced while the structural member is being permanently fixed in such orientation to ensure that there has been no deviation from the required orientation, this being accomplished by ensuring that the bubble remains centered in the relevant reference field.

Generally, the level must be maintained mounted flush against the structural member while the structural member is being precisely aligned in spatial orientation and further, must be continually maintained mounted flush therewith while the structural member is being permanently fixed in position. Typically the maintenance of the level in a mounted flush condition with respect to the structural member has been accomplished by manual manipulation, i.e., the level is continually maintained in position mounted flush against the structural member by the utilization of hands.

In the prior art, one customary practice has been to utilize two person teams to spatially orientate and permanently position structural members. One person has been responsible for maintaining the level mounted flush with the surface of the structural member as well as determining and maintaining the proper spatial orientation while the other person has been responsible for permanently fixing the structural member in position. It will be appreciated, however, that such a method of operation is not an effective utilization of manpower resources.

Another customary practice in the construction industry has been for a single person to accomplish both operations, that is maintaining the level mounted flush against the structural member while concomitantly precisely aligning the structural member in the required spatial orientation, and maintaining the structural member in the desired orientation while permanently fixing the structural member in position. It will be recognized, however, that such a single person operation is not always feasible due to the length, weight or awkward-handling characteristics of the structural member to be positioned.

While a means to maintain a level flush with a structural member without the necessity of continual manual manipulation would be a boon to the construction industry, the development of such a means has been hampered by the fact that the construction industry in general utilizes structural members having a wide diversity in both configuration and composition. Structural elements such as pipe are usually circular or avoid in cross-section and formed from such diverse materials as iron, steel, concrete or PVCs. Structural members such as beams may be formed from such materials as iron, steel or wood and be of square, rectangular, I, or T cross-sectional configuration. Additionally, the structural members may be formed of either magnetic or non-magnetic materials.

Because of the diverse configurations of the wide variety of structural members, as well as the wide variety in dimensions and diameters thereof, a means has not been developed which has near-universal application for independently maintaining, i.e., without manual manipulation—hands-free, a level mounted flush with a wide variety of structural members. The prior art, however, is replete with level holding devices which are adapted for limited applications. For example, U.S. Pat. No. 4,501,057 illustrates a carpenter's level holding device having utility in vertically orientating wooden beams. U.S. Pat. No. 4,593,475 discloses a level with slotted magnet support such that the level can be maintained flush with the corner or side of a pipe while the pipe is fixed in a predetermined spatial orientation. Such a slotted magnetic support means is limited, however, to structural members which are composed of magnetic materials.

SUMMARY OF THE INVENTION

The present invention surmounts the inherent disadvantages of the prior art by providing a level indicating device comprising a level means having detachable securing clips which elastically engage a sufficient portion of the peripheral surface of a structural member so as to maintain the level means mounted flush with the structural member without the necessity of continual manual manipulation of the level means. The level means has clip-receiving slots formed in the ends thereof adjacent the working surface of the level means. Detachable securing clips are force-fit inserted into the clip receiving slots in such a manner that the securing clips are detachably secured to the level means.

The typical securing clip is a symmetrical mirror-image type structure which in one preferred embodiment includes a transverse segment, first and second opposed leg segments, and curved end segments. The transverse segment of the securing clip is adapted for force-fit insertion into the clip-receiving slot formed in the level means. The first and second opposed leg segments are adapted to elastically engage the outer peripheral surface of the structural member to maintain the level mounted flush with the structural member irrespective of the spatial orientation thereof. The curved end segments facilitate the initial elastic engagement of the structural member by the securing clips.

The detachable securing clips are formed to have differing cross-sectional configurations, such as avoid or triangular in a non-elastic condition depending upon the configuration of the structural member. By varying the length of the first and second opposed legs, sets of detachable securing clips may be formed which are adapted to elastically engage structural members having a wide range of outer diameters or cross-sectional dimensions or configurations such that a single level means may be used for a variety of jobs merely by interchanging detachable securing clips of differing sizes which are force-fit inserted into the clip-receiving slots formed in the level means.

To further facilitate the utility of the present invention, the level means includes indicating means for providing a visually perceptible indication of the spatial orientation of the structural member. The level indicating means comprises one or more liquid filled glass tubes, having a bubble injected therein, disposed in horizontal, vertical, and/or pitched planes. The one or more glass tubes have visually perceptible multiple gradations superimposed thereon forming the reference field. By centering the bubble between a predetermined pair of adjacent gradations a structural member can be precisely orientated in a horizontal, vertical or set pitched plane, or at a specified pitch with respect to the primary plane of the glass tube.

BRIEF DESCRIPTION OF THE DRAWINGS

A more complete understanding of the present invention and the attendant advantages and features thereof will be more readily understood by reference to the following detailed description when considered in conjunction with the accompanying drawings wherein.

DETAILED DESCRIPTION OF PREFERRED EMBODIMENTS

Figure 1:
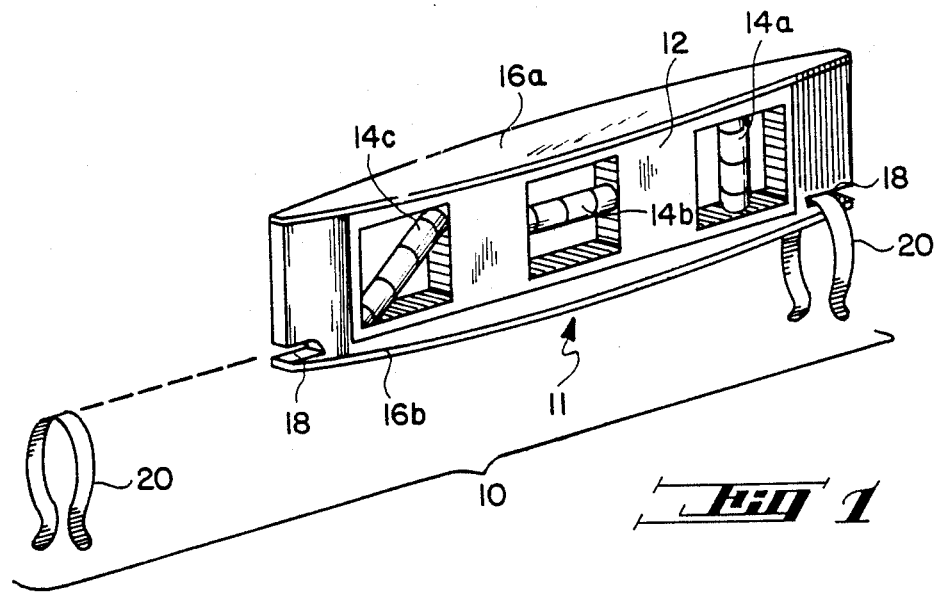
FIG. 1 is a perspective view of a level incorporating the detachable securing clips of the present invention.

Referring now to the drawings wherein like reference numerals designate corresponding or similar elements throughout the several views, there is shown generally in FIG. 1 a level indicating device 10 comprising a level 11 having first and second detachable securing clips 20 associated therewith. As will be discussed in further detail hereinbelow, the securing clips 20 elastically engage the periphery of a structural member (not shown), such as a pipe, to independently maintain the level indicating device 10 mounted in a flush, static relation with respect to the structural member without subsequent manual manipulation while the structural member is aligned and subsequently fixed in a predetermined orientation.

Levels 11 utilized by carpenters, electricians, plumbers and other craftsmen have the same general configuration which includes a body or frame 12 having one or more level indicating means 14 inset therein. The level indicating device 10 illustrated in FIG. 1 has three level indicating means 14, a vertical indicating means 14a, a horizontal indicating means 14b, and a pitch indicating means 14c, which facilitates the use of one level indicating device 10 to spatially orientate a variety of structural members requiring differing spatial orientations.

Figure 2:
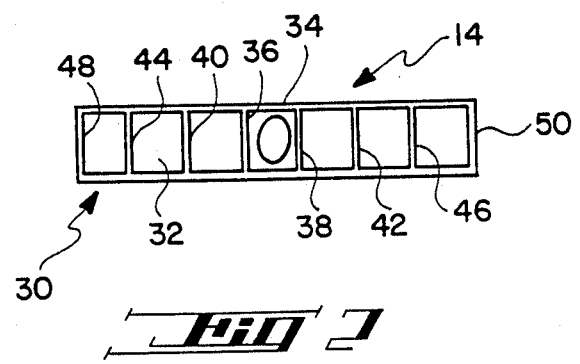
FIG. 2 is a detailed side view of a level indicating means comprising a liquid filled slightly curved glass tube having a multiple gradation reference field.

As illustrated in greater detail in FIG. 2, the level indicating means 14 comprises a glass tube 30 filled with a liquid 32 such as alcohol or ether. A bubble 34 is injected into the liquid filled interior of the glass tube 30 to provide a visually perceptible mobile reference mark. A series of visually perceptible gradations 36, 38, 40, 42, 44, 46, 48, 50 are superimposed upon the exterior surface of the glass tube 30, as for example by chemical etching. The fields between each pair of adjacent gradations define different predetermined pitch rates and, in combination with the bubble 34, provide a visually perceptible means for quickly aligning and/or ascertaining the orientation of the structural member.

By way of example only, if the level indicating means 14 of FIG. 2 is the horizontal indicating means 14b, then the field between gradations 36 and 38 represents the horizontal plane orientation, i.e., a zero pitch rate. The other fields would then represent a specified deviation or pitch rate with respect to the horizontal plane. For example, the field between gradations 38 and 42 may represent a positive pitch rate of one eighth inch per foot, the field between gradations 42 and 46 may represent a positive pitch rate of one fourth inch per foot, the field between gradations 46 and 50 may represent a positive pitch rate of one half inch per foot, and the fields between gradations 36 and 40, 40 and 44, and 44 and 48 represent corresponding negative pitch rates. Thus, by centering the movable bubble 34 within the field between a predetermined pair of adjacent gradations, a visually perceptible indication of the spatial orientation of the structural member is readily obtained. It is to be understood that the pitch rates represented by the fields between pairs of adjacent gradations could be other than as disclosed hereinabove.

The level 11 may include only an upper working surface 16a or a lower working surface 16b, or the level 11 may include both an upper and lower working surfaces 16a, 16b. As used herein the working surface 16 is that segment ofa the level 11 which is maintained mounted flush with an appropriate surface of the structural member during the alignment and subsequent fixation of the structural member in its predetermined spatial orientation. The working surface 16 may be planar, curved or of other geometric configuration, depending upon the particular application.

The embodiment of the level indicating device 10 depicted in FIG. 1 further includes one set of clip-receiving slots 18 formed in the ends of the frame 12 adjacent the working surface 16b. For embodiments wherein the level indicating device 10 has both an upper and lower working surface 16a, 16b two sets of clip-receiving slots 18 would be formed in the frame 12. The clip-receiving slots 18 are sized so that the detachable securing clips 20 are force-fit insertable therein. Such a structural interrelationship between the clip-receiving slots 18 and the securing clips 20 ensures that the securing clips 20 are statically disposed with respect to the level 11, i.e., there is no relative displacement therebetween which could adversely affect the relationship of the level 11 with respect to the structural member during alignment and fixation operations. Yet, at the same time the detachable securing clips 20 may be removed from clip-receiving slots 18 aby the proper application of force so that the clip-receiving slots 18 can interchangeably receive securing clips 20 of differing size.

Figure 3:
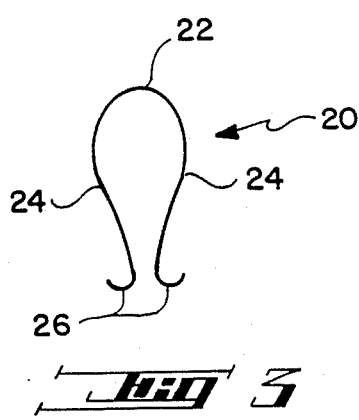
FIG. 3 is an end view of one embodiment of a detachable securing clip according to the present invention.

One embodiment of a detachable securing clip 20 according to the present invention is illustrated in FIG. 3. This embodiment possesses utility for mounting levels 11 flush with circular, elliptical or other pipe-type structural members. The securing clip 20 of FIG. 3 is a symmetrical, mirror-image type structure having an approximately ovoid cross-section. The securing clip 20 includes a transverse segment 22 which is adapted to be inserted by force fitting into the clip-receiving slots 18, first and second opposed leg segments 24 adapted to elastically engage a portion of the periphery of a pipe-type structural member, and curved end segments 26 which facilitate the initial elastic engagement of the securing clips 20 with the structural member.

Figure 4:
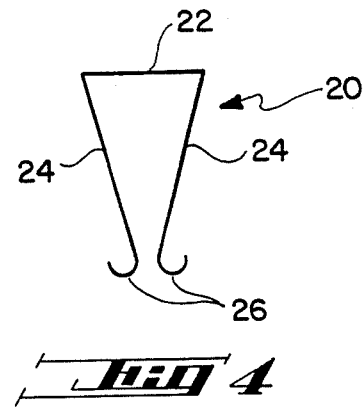
FIG. 4 is an end view of another embodiment of a detachable securing clip according to the present invention.

A further embodiment of a detachable securing clip 20 is illustrated in FIG. 4, this embodiment having an approximately triangular cross-section and possessing particular utility in elastically engaging structural members having rectangular or square cross-sections. The elements of this embodiment are equivalent to those described for the embodiment of FIG. 3, it being understood that the opposed legs 24 elastically engage sufficient portions of the structural member to ensure that the level 11 is statically maintained in a mounted flush relation with respect to the structural member.

By varying the length of the opposed legs 24 as well as the cross-sectional configuration, sets of detachable securing clips 20 can be formed which are adapted to elastically engage structural members having a wide range of O.D.s or cross-sectional dimensions or configurations, thus enabling a craftsman to utilize one level indicating device 10 having clip-receiving slots 18 for a wide variety of jobs. The user merely selects the pair of detachable securing clips 20 which is of the size and cross-sectional configuration required to elastically engage the periphery of the structural member to be permanently positioned in whatever predetermined spatial orientation and force-fit inserts the selected detachable securing clips 20 into the clip-receiving slots 18.

The level 11 is then pressed against the structural member so that the curved end segments 26 engage the outer peripheral surface thereof. Increasing the force of engagement causes the opposed legs 24 to be increasingly forced apart until the opposed legs 24 are elastically engaged with the outer peripheral surface of the structural member, at which point the level indicating device 10 is mounted flush against the structural member.

The detachable securing clips 20 may be formed of any resilient material such that the opposed legs 24 of each securing clip 20 will move outwardly with respect to each other during elastic engagement of the structural member, while at the same time exerting a force causing the opposed legs 24 to press against the outer peripheral surface of the structural member. The securing clips 20 may be formed without the curved end segments 26.

A variety of modifications and variations of the present invention are possible in light of the above teachings. It is therefore to be understood that within the scope of the appended claims, the present invention may be practiced otherwise than as specifically described hereinabove.

What is claimed as new and desired to be secured by Letters Patent of the United States is:

1. A hands-free level indicating device for spatial orientation of any one of a variety of structural members of differing cross-sectional configurations and dimensions, comprising:

level means for mounting flush against one structural member having a defined cross-sectional configuration and dimension, said level means including level indicating means for determining the spatial orientation of the one structural member;

one securing means selected from a set of securing means for elastically engaging sufficient portions of the outer periphery of the one structural member to statically maintain said hands-free level indicating device mounted flush against the one structural member, the set of securing means including a plurality of securing means having configurations corresponding to the differing cross-sectional configurations and dimensions of the variety of structural members, and wherein said selected one securing means has a cross-sectional configuration corresponding to the defined cross-sectional configuration and dimension of the one structural member for elastic engagement of sufficient portions of the outer periphery thereof when engaged therewith; and wherein said level means further includes means for force-fit receiving said selected one securing means to detachably mount said selected one securing means to said level means wherein said hands-free level indicating device is mounted flush against the one structural member for any spatial orientation thereof by said selected one securing means elastically engaging sufficient portions of the outer periphery of the one structural member.

2. The hands-free level indicating device of claim 1 wherein said set of securing means comprises a set of pairs of detachable securing clips of varying cross-sectional configurations and wherein said selected one securing means comprises a selected pair of detachable securing clips having said cross-sectional configuration corresponding to the defined cross-sectional configuration and dimension of the one structural member to elastically engage sufficient portions of the outer periphery of the one structural member.

3. The hands-free level indicating device of claim 2 wherein each of said selected pair of detachable securing clips further includes a transverse segment coacting with said force-fit receiving means of said level means to detachably mount said selected pair of detachable securing clips to said level means by press fitting, and first and second opposed leg segments integrally formed with opposed ends of said transverse segment, said first and second opposed leg segments adapted to elastically engage sufficient portions of the outer periphery of the one structural member wherein said level means is maintained mounted flush with the one structural member for any spatial orientation thereof.

4. The hands-free level indicating device of claim 3 wherein each of said selected pair of detachable securing clips further includes curved end segments integrally formed with said first and seccond opposed leg segments, respectively, and wherein said curved end segments initially engage the outer periphery of the one structural member to cause said first and second opposed leg segments to gradually move apart until said said first and second opposed leg segments have elastically engaged sufficient portions of the outer periphery of the one structural member.

5. The hands-free level indicating device of claim 3 wherein said cross-sectional configuration of each of said selected pair of detachable securing clips is a generally ovoid cross-sectional configuration.

6. The hands-free level indicating device of claim 3 wherein said cross-sectional configuration of each of said selected pair of detachable securing clips is a generally triangular cross-sectional configuration.

7. The hands-free level indicating device of claim 2 wherein said level means includes a working surface adapted to be disposed in mounted flush relation with the outer periphery of the one structural member and wherein said force-fit receiving means are clip receiving slots formed in opposed ends of said level means adjacent said working surface, and further wherein each of said selected pair of detachable securing clips is detachably mounted to said level means by force-fit insertion into respective ones of said clip receiving slots.

8. The hands-free level indicating device of claim 1 wherein said level indicating means comprises at least one liquid filled glass tube having a movable reference mark disposed therein and a plurality of gradations superimposed on the outer surface thereof, each pair of adjacent ones of said plurality of gradations defining a field therebetween, and wherein each of said fields defined by said each pair of said adjacent ones of said plurality of gradations represents a predetermined pitch rate, the spatial orientation of the one structural member being determined by said predetermined pitch rate of said field wherein said movable reference mark is disposed.

9. A hands-free level indicating device for spatial orientation of any one of a variety of structural members of differing cross-sectional configurations and dimensions, comprising:

a level having clip receiving slots formed in opposed ends of said level, and wherein said level further includes at least one level indicating means for indicating the spatial orientation of the one structural member having a defined cross-sectional configuration and dimension;

a pair of detachable securing clips selected from a set of pairs of detachable securing clips for elastically engaging sufficient portions of the outer periphery of the one structural member to statically maintain said hands-free level indicating device mounted flush with the one structural member, the set of pairs of detachable securing clips including a plurality of pairs of detachable securing clips having configurations corresponding to the differing cross-sectional configurations and dimensions of the variety of structural members, and wherein said selected pair of detachable securing clips, having a cross-sectional configuration corresponding to the defined cross-sectional configuration and dimension of the one structural member for elastic engagement of sufficient portions of the outer periphery of the one structural member when engaged therewith, is detachable mounted by force-fitting in corresponding ones of said clip receiving slots, each of said selected pair of detachable securing clips including a transverse segment adapted for force-fit insertion in corresponding ones of said clip receiving slots to detachable mount said selected pair of detachable securing clips to said level, and first and second opposed leg segments integrally formed with said opposed ends of said transverse segment, said first and second opposed leg segments adapted to elastically engage sufficient portions of the outer periphery of the one structural member wherein said hands-free level indicating device is maintained statically flush with the one structural member for any spatial orientation thereof without manual manipulation.

10. The hands-free level indicating device of claim 9 wherein said selected pair of detachable securing clips further includes first and second curved end segments integrally formed with said first and second opposed leg segments, respectively, to initially engage the outer periphery of the one structural member causing said first and second opposed leg segments to gradually move apart until said first and second opposed leg segments have elastically engaged sufficient portions of the outer periphery of the one structural member.

11. The hands-free level indicating device of claim 9 wherein said level further includes a working surface adapted to be disposed flush with the outer periphery of the one structural member, and wherein said clip receiving slots are formed in opposed ends of said level adjacent said working surface.

12. The hands-free level indicating device of claim 9 wherein said at least one level indicating means comprises a liquid filled glass tube having a movable reference mark disposed therein and a plurality of gradations superimposed on the outer surface thereof, each pair of adjacent ones of said plurality of gradations defining a field therebetween, and wherein each of said fields defined by said each pair of said adjacent ones of said plurality of gradations represents a predetermined pitch rate, the spatial orientation of the one structural member being determined by said predetermined pitch rate of said field wherein said movable reference mark is disposed.

* * * * *

UNITED STATES PATENT AND TRADEMARK OFFICE
CERTIFICATE OF CORRECTION

PATENT NO. : 4,829,676
DATED : May 16, 1989
INVENTOR(S) : David C. Waldron

It is certified that error appears in the above-identified patent and that said Letters Patent is hereby corrected as shown below:

Column 2, line 14, "avoid" should read --ovoid--.

Column 3, line 2, "avoid" should read --ovoid--.

Column 4, line 44, "ofa" should read --of--.

Column 4, line 68, "aby" should read --by--.

Column 6, line 63, "seccond" should read --second--.

Signed and Sealed this

Thirtieth Day of July, 1991

Attest:

HARRY F. MANBECK, JR.

*Attesting Officer*  *Commissioner of Patents and Trademarks*